United States Patent
Shiono et al.

(10) Patent No.: US 6,576,737 B2
(45) Date of Patent: Jun. 10, 2003

(54) CURABLE COMPOSITIONS OF FLUORINATED AMIDE COMPOUNDS

(75) Inventors: Mikio Shiono, Gunma-ken (JP); Takashi Matsuda, Gunma-ken (JP); Masatoshi Arai, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/969,829

(22) Filed: Oct. 4, 2001

(65) Prior Publication Data

US 2002/0061969 A1 May 23, 2002

(30) Foreign Application Priority Data

Oct. 4, 2000 (JP) ....................................... 2000-304514

(51) Int. Cl.$^7$ .............................................. C08G 77/24
(52) U.S. Cl. ............................ 528/42; 528/15; 528/28; 528/31; 528/38; 525/100; 525/101; 525/102; 525/431; 525/474; 525/477; 525/478; 525/509
(58) Field of Search .............................. 528/15, 28, 31, 528/38, 42; 525/100, 101, 102, 474, 478, 477, 431, 509

(56) References Cited

U.S. PATENT DOCUMENTS 5,385,999 A * 1/1995 D'Anvers et al. ............ 528/21
5,656,711 A * 8/1997 Fukuda et al. ................ 528/25
6,160,074 A * 12/2000 Matsuda et al. .............. 528/42
6,417,311 B1 * 7/2002 Fukuda et al. ................ 528/42

FOREIGN PATENT DOCUMENTS

JP 05-331291 A * 12/1993 ........... C08G/77/38
JP A9-95615 4/1997

OTHER PUBLICATIONS

Derwent Abstract of JP 05–331291 A. Kamei et al., 12–1993.*

* cited by examiner

*Primary Examiner*—Robert Dawson
*Assistant Examiner*—Jeffrey B. Robertson
(74) *Attorney, Agent, or Firm*—Birch, Stewart, Kolasch & Birch, LLP

(57) ABSTRACT

A curable composition comprising (A) a fluorinated amide compound having at least one alkenyl radical, (B) a fluorinated organohydrogensiloxane, (C) a platinum group compound, (D) a first organosiloxane having at least one SiH radical and at least one epoxy and/or trialkoxysilyl radical, and (E) a second organosiloxane having at least one SiH radical, at least one cyclic carboxylic anhydride residue, and at least one monovalent perfluorooxyalkyl or perfluoroalkyl radical cures into a fluorinated elastomer that not only has good solvent resistance, chemical resistance, heat resistance, low-temperature properties, low moisture permeability and electrical properties, but also firmly bonds to a variety of substrates including PPS, polyamide and polyimide resins.

11 Claims, No Drawings

CURABLE COMPOSITIONS OF FLUORINATED AMIDE COMPOUNDS

This invention relates to curable compositions which cure into fluorinated elastomers having a good adhesion to a variety of substrates such as polyphenylene sulfide resins, polyamide resins and polyimide resins.

BACKGROUND OF THE INVENTION

Curable fluorinated elastomer compositions utilizing addition reaction between alkenyl and hydrosilyl radicals are well known in the art. It is also known from JP-A 9-95615 to add an organopolysiloxane having a hydrosilyl radical and an epoxy and/or trialkoxy radical as a third component to such a composition for rendering it self-adhesive. This composition can be cured by brief heating while it can bond to a variety of substrates during curing. Since the cured product has good solvent resistance, chemical resistance, heat resistance, low-temperature properties, low moisture permeability and electrical properties, the composition is useful in an adhesion application in a variety of industrial fields where such properties are required.

The composition forms a satisfactory bond to such plastics as epoxy resins, phenolic resins and polyester resins, but a less satisfactory bond to such plastics as polyphenylene sulfide (PPS) resins, polyamide resins and polyimide resins. The composition is not applicable where PPS, polyamide and polyimide resins are used. Since PPS, polyamide and polyimide resins are often used as automotive parts and electrical and electronic parts, an improvement in bond to these plastics is desired.

SUMMARY OF THE INVENTION

An object of the invention is to provide a novel and improved curable composition which cures into a fluorinated elastomer that firmly bonds to PPS, polyamide and polyimide resins.

The invention pertains to a curable composition comprising (A) a fluorinated amide compound having at least one alkenyl radical in a molecule, (B) a fluorinated organohydrogensiloxane as a crosslinker/chain extender, and (C) a platinum group compound as a catalyst. It has been found that by adding to this composition (D) a first organosiloxane having in a molecule at least one hydrogen atom directly attached to a silicon atom (i.e., SiH radical), and at least one epoxy and/or trialkoxysilyl radical each attached to a silicon atom through a carbon atom or a carbon atom and an oxygen atom, and preferably, at least one perfluorooxyalkyl or perfluoroalkyl radical as a tackifier, and (E) a second organosiloxane having in a molecule at least one hydrogen atom directly attached to a silicon atom, at least one cyclic carboxylic anhydride residue attached to a silicon atom through a carbon atom, and at least one monovalent perfluorooxyalkyl or perfluoroalkyl radical attached to a silicon atom through a carbon atom as an adhesive reaction accelerator, there is obtained a curable composition which cures into a fluorinated elastomer that not only has good solvent resistance, chemical resistance, heat resistance, low-temperature properties, low moisture permeability and electrical properties, but also firmly bonds to a variety of substrates including PPS, polyamide and polyimide resins.

The invention provides a curable composition comprising as essential components, (A) a fluorinated amide compound having at least one alkenyl radical in a molecule, (B) a fluorinated organohydrogensiloxane, (C) a platinum group compound, (D) a first organosiloxane having in a molecule at least one hydrogen atom directly attached to a silicon atom, and at least one of epoxy radicals and trialkoxysilyl radicals each attached to a silicon atom through a carbon atom or a carbon atom and an oxygen atom, and (E) a second organosiloxane having in a molecule at least one hydrogen atom directly attached to a silicon atom, at least one cyclic carboxylic anhydride residue attached to a silicon atom through a carbon atom, and at least one monovalent perfluorooxyalkyl or perfluoroalkyl radical attached to a silicon atom through a carbon atom.

DESCRIPTION OF THE PREFERRED EMBODIMENT

Briefly stated, the curable composition of the invention contains (A) a fluorinated amide compound having an alkenyl radical as a base polymer, (B) a fluorinated organohydrogensiloxane as a crosslinker and chain extender, (C) a platinum group compound as a catalyst, (D) a first organosiloxane as a tackifier, and (E) a second organosiloxane as an adhesive reaction accelerator.

Component (A) is a fluorinated amide compound which should have at least one alkenyl radical in a molecule, and preferably two alkenyl radicals at opposite ends. In the compound, fluorine is preferably contained as a monovalent perfluorooxyalkyl, monovalent perfluoroalkyl, divalent perfluorooxyalkylene or divalent perfluoroalkylene radical. Preferably the compound has the following linkage.

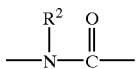

Herein $R^2$ is hydrogen or a substituted or unsubstituted monovalent hydrocarbon radical having 1 to 10 carbon atoms, especially 1 to 8 carbon atoms, and preferably free of aliphatic unsaturation.

Further, the compound may have the following linkage.

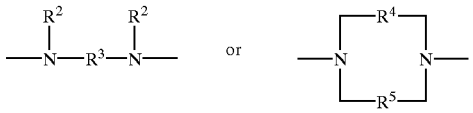

Herein $R^2$ is as defined above; $R^3$ is a substituted or unsubstituted divalent hydrocarbon radical which may be separated by at least one atom of oxygen, nitrogen and silicon atoms; $R^4$ and $R^5$ each are a substituted or unsubstituted divalent hydrocarbon radical.

The fluorinated amide compound (A) is preferably of the following general formula (1).

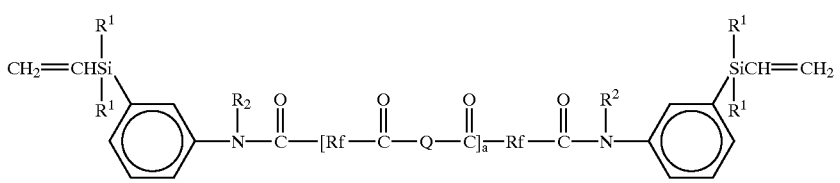
(1)

Referring to formula (1), $R^1$ stands for substituted or unsubstituted monovalent hydrocarbon radicals preferably of 1 to 10 carbon atoms, more preferably 1 to 8 carbon atoms, and also preferably free of aliphatic unsaturation. Examples include alkyl radicals such as methyl, ethyl, propyl, isopropyl, butyl, isobutyl, tert-butyl, pentyl, hexyl, octyl and decyl; cycloalkyl radicals such as cyclopentyl, cyclohexyl and cycloheptyl; alkenyl radicals such as vinyl, allyl, propenyl, isopropenyl, butenyl, and hexenyl; aryl radicals such as phenyl, tolyl, xylyl and naphthyl; aralkyl radicals such as benzyl, phenylethyl and phenylpropyl; and substituted ones of these radicals in which some or all of the hydrogen atoms are replaced by halogen atoms or the like, typically fluorinated alkyl radicals such as chloromethyl, chloropropyl, bromoethyl, 3,3,3-trifluoropropyl, and 6,6,6, 5,5,4,4,3,3-nonafluorohexyl.

$R^2$ stands for hydrogen or substituted or unsubstituted monovalent hydrocarbon radicals preferably of 1 to 10 carbon atoms, more preferably 1 to 8 carbon atoms, and also preferably free of aliphatic unsaturation, as defined above for $R^1$. Examples of the monovalent hydrocarbon radicals are as exemplified above for $R^1$, for example, alkyl radicals such as methyl, ethyl, propyl, and isopropyl; cycloalkyl radicals such as cyclohexyl; alkenyl radicals such as vinyl and allyl; aryl radicals such as phenyl and tolyl; and substituted ones of these radicals in which some hydrogen atoms are replaced by halogen atoms or the like, typically fluorinated alkyl radicals such as chloromethyl, chloropropyl, 3,3,3-trifluoropropyl, and 6,6,6,5,5,4,4,3,3-nonafluorohexyl.

Q is a radical of the following general formula (2) or (3).

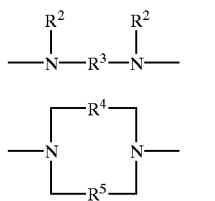

$R^2$ in formula (2) is as defined above. $R^3$ may be selected from substituted or unsubstituted divalent hydrocarbon radicals, preferably from divalent hydrocarbon radical of 1 to 20 carbon atoms, especially 2 to 10 carbon atoms. Examples include alkylene radicals such as methylene, ethylene, propylene, methylethylene, butylene and hexamethylene; cycloalkylene radicals such as cyclohexylene; arylene radicals such as phenylene, tolylene, xylylene, naphthylene and biphenylene; substituted ones of these radicals in which some hydrogen atoms are replaced by halogen atoms or the like; and combinations of these substituted or unsubstituted alkylene and arylene radicals.

$R^3$ may contain one or more atoms of oxygen, nitrogen and silicon atoms at an intermediate of its linkage. In this case, the oxygen atom intervenes in the linkage of $R^3$ in the form of —O—. The nitrogen atom intervenes in the linkage of $R^3$ in the form of —NR'—wherein R' is hydrogen, alkyl of 1 to 8 carbon atoms, especially 1 to 6 carbon atoms or aryl. The silicon atom intervenes in the linkage of $R^3$ in the form of a straight or cyclic organosiloxane-containing radical or organosilylene radical as shown below.

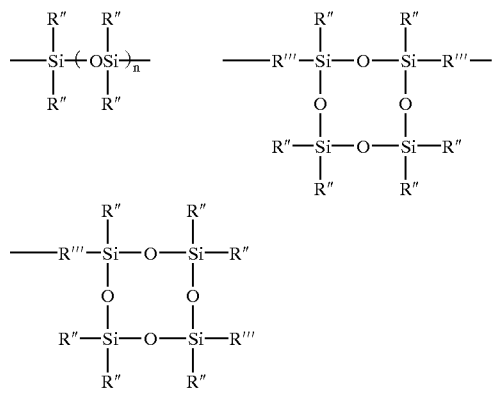

Herein, R" is an alkyl radical of 1 to 8 carbon atoms or aryl radical as exemplified for $R^1$ and $R^2$, R'" is an alkylene radical of 1 to 6 carbon atoms or arylene radical as exemplified for $R^3$, and n is an integer of 0 to 10, especially 0 to 5.

Examples of these radicals are given below.

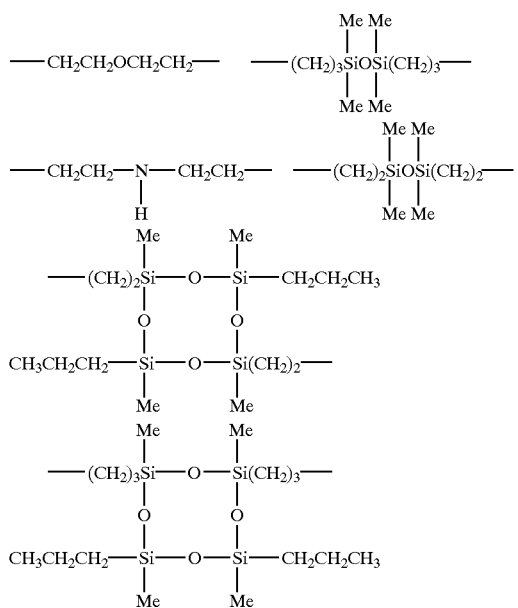

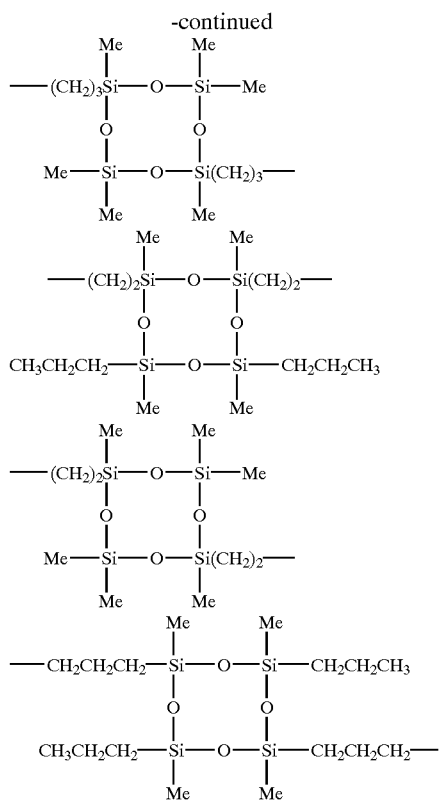

In the above formulae, Me is methyl.

In formula (3), $R^4$ and $R^5$ are substituted or unsubstituted divalent hydrocarbon radicals of 1 to 10 carbon atoms, especially 2 to 6 carbon atoms. Illustrative are alkylene radicals such as methylene, ethylene, propylene, methylethylene, butylene, and hexamethylene, cycloalkylene radicals such as cyclohexylene, and substituted ones of these radicals in which some of the hydrogen atoms are replaced by halogen atoms.

The radicals Q in formula (1), represented by formula (2) or (3), are exemplified below. In the following chemical formulae, Me is methyl, Ph is phenyl, and X is hydrogen, methyl or phenyl.

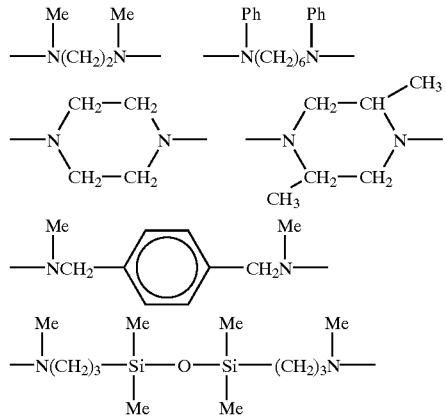

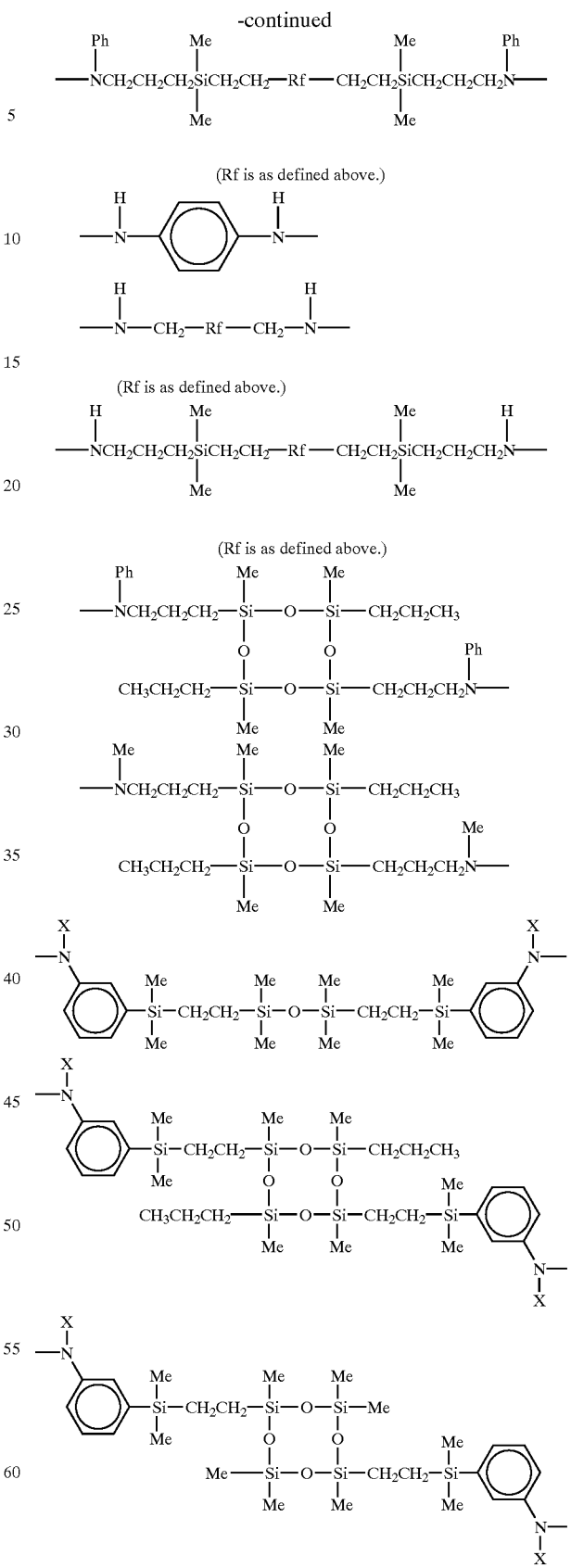

In formula (1), Rf is a divalent perfluoroalkylene radical or divalent perfluoropolyether radical. The divalent perfluoroalkylene radical is represented by —$C_mF_{2m}$—wherein m is 1 to 10, preferably 2 to 6. The divalent perfluoropolyether radical is represented by the following formulae:

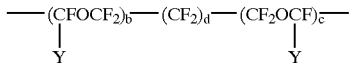

wherein Y is F or $CF_3$ radical, b, c and d are integers satisfying $b \geq 1$, $c \geq 1$, $2 \leq b+c \leq 200$, especially $2 \leq b+c \leq 110$, and $0 \leq d \leq 6$;

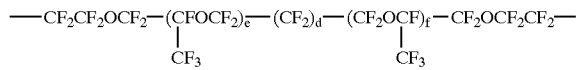

wherein d, e and f are integers satisfying $0 \leq d \leq 6$, $e \geq 0$, $f \geq 0$, and $0 \leq e+f \leq 200$, especially $2 \leq e+f \leq 110$;

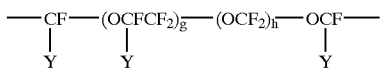

wherein Y is F or $CF_3$ radical, g and h are integers satisfying $1 \leq g \leq 20$ and $1 \leq h \leq 20$;

wherein i is an integer of 1 to 100.

Illustrative examples of Rf are given below.

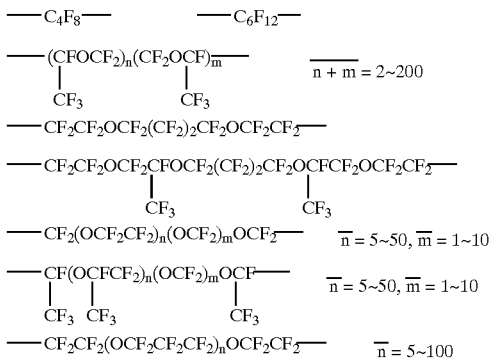

In formula (1), letter "a" is an integer inclusive of 0, which indicates that the fluorinated amide compound of formula (1) contains at least one divalent perfluoroalkylene radical or divalent perfluoropolyether radical in a molecule. Preferably, "a" is an integer of 0 to 10, and more preferably 1 to 6.

The fluorinated amide compound (A) used herein may range from a low viscosity polymer having a viscosity of about several tens of centistokes at 25° C. to a solid gum-like polymer. From the standpoint of ease of handling, a gum-like polymer is suited for use as heat vulcanizable rubber, and a polymer having a viscosity of about 100 to 100,000 centistokes at 25° C. is suited for use as liquid rubber. With too low a viscosity, the resulting cured elastomer may be short in elongation and fail to provide a good profile of physical properties.

The fluorinated amide compound of formula (1) can be prepared by the following method. For example, a fluorinated amide compound of formula (1) wherein "a"=0 can be synthesized, for example, by reacting a compound having acid fluoride radicals at both ends represented by the general formula (4) with a primary or secondary amine compound represented by the general formula (5) in the presence of an acid acceptor such as trimethylamine.

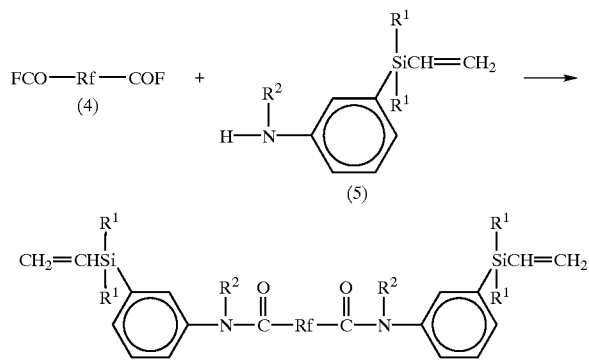

Herein, $R^1$, $R^2$ and Rf are as defined above.

Further, a fluorinated amide compound of formula (1) wherein "a" is an integer of at least 1 can be synthesized, for example, by reacting a compound having acid fluoride radicals at both ends represented by formula (4) with a diamine compound represented by the general formula (6):

wherein Q is as defined above, in the presence of an acid acceptor, followed by reaction with a primary or secondary amine compound of formula (5).

In the former procedure, the relative amounts of the compound having acid fluoride radicals at both ends of formula (4) and the primary or secondary amine compound of formula (5) charged are not critical. Preferably the amount (a) of the compound of formula (4) and the amount (b) of the compound of formula (5) charged are adjusted such that the molar ratio of (a)/(b) may range from 0.1/1 to 1.2/1 mol/mol, and especially from 0.2/1 to 0.5/1 mol/mol.

In the latter procedure, the amount (a) of the compound of formula (4) and the amount (c) of the compound of formula (6) charged are not critical as long as the molar amount (a) is not smaller than the molar amount (c). The recurring units (a) in formula (1) may be set to an appropriate value for a particular purpose by adjusting the molar ratio of (a)/(c). With greater settings of (a)/(c), polymers having a relatively low molecular weight can be synthesized. With setting of (a)/(c) approximate to unity (1), polymers having a relatively high molecular weight can be synthesized.

Reaction conditions are not critical although the preferred conditions include 20 to 100° C. and 1 to 8 hours, and more preferably 20 to 50° C. and 2 to 4 hours.

It is noted that the fluorinated amide compound of formula (1) wherein Q is a linkage having an intervening silicon atom can be synthesized, for example, by first effecting reaction as mentioned above using an amine compound of formula (5) as the primary or secondary amine compound having an aliphatic unsaturated radical such as vinyl or allyl, thereby forming a both end vinyl-terminated compound of the following general formula (7), then reacting the compound of formula (7) with an organosiloxane compound having two hydrosilyl radicals in a molecule, as represented by the following general formula (8), in the presence of an addition reaction catalyst.

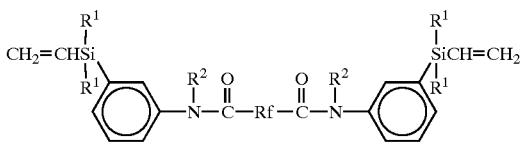

(7)

Herein R¹, R² and Rf are as defined above.

    (8)

Herein P is a divalent organic radical having a siloxane linkage, illustrative examples of which are given below.

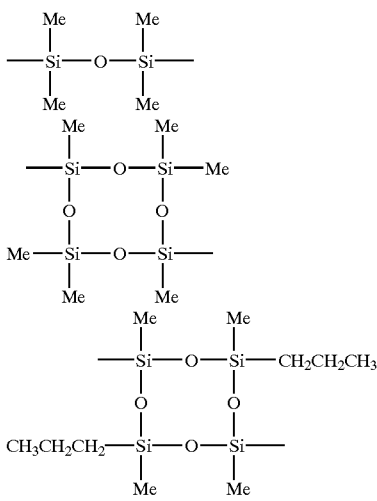

In this reaction, the relative amounts of the both end vinyl-terminated compound of formula (7) and the compound of formula (8) charged should be such that the molar amount (d) of the compound (7) charged be greater than the molar amount (e) of the compound (8) charged. The ratio of (d)/(e) is at most 2. That is, 1<(d)/(e)≦2. With greater settings of (d)/(e), polymers having a relatively low molecular weight can be synthesized. With setting of (d)/(e) approximate to unity (1), polymers having a relatively high molecular weight can be synthesized.

The catalyst used herein may be selected from elements of Group VIII in the Periodic Table and compounds thereof, for example, chloroplatinic acid, alcohol-modified chloroplatinic acid (see U.S. Pat. No. 3,220,972), complexes of chloroplatinic acid with olefins (see U.S. Pat. Nos. 3,159,601, 3,159,662 and 3,775,452), platinum black and palladium on such carriers as alumina, silica and carbon, rhodium-olefin complexes, and chlorotris(triphenylphosphine)rhodium (known as Wilkinson catalyst). Such a catalyst may be used in a catalytic amount. The above-described complexes are preferably used as solutions in alcohol, ketone, ether and hydrocarbon solvents.

The preferred reaction conditions include 50 to 150° C., more preferably 80 to 120° C. and 2 to 4 hours.

Component (B) is a fluorinated organohydrogensiloxane which serves as a crosslinker and chain extender for the fluorinated amide compound (A). The fluorinated organohydrogensiloxane should have at least one monovalent perfluorooxyalkyl, monovalent perfluoroalkyl, divalent perfluorooxyalkylene or divalent perfluoroalkylene radical, and at least two, preferably at least three hydrosilyl radicals (i.e., SiH radicals) in a molecule.

The perfluorooxyalkyl, perfluoroalkyl, perfluorooxyalkylene and perfluoroalkylene radicals are typically represented by the following general formulae.

Monovalent perfluoroalkyl radical:
$C_mF_{2m+1}$—wherein m is an integer of 1 to 20, and preferably 2 to 10.

Divalent perfluoroalkylene radical:
—$C_mF_{2m}$—wherein m is an integer of 1 to 20, and preferably 2 to 10.

Monovalent perfluorooxyalkyl radical:

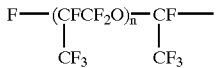

wherein n is an integer of 1 to 5.

Divalent perfluorooxyalkylene radical:

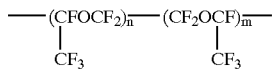

wherein an average of m+n is an integer of 2 to 100.

The fluorinated organohydrogensiloxane may be cyclic or chain-like or even three-dimensional network. Especially preferred are fluorinated organohydrogensiloxanes having in the molecule at least one monovalent organic radical containing a perfluoroalkyl, perfluoroalkyl ether or perfluoroalkylene, as shown below, as a monovalent substituent attached to a silicon atom.

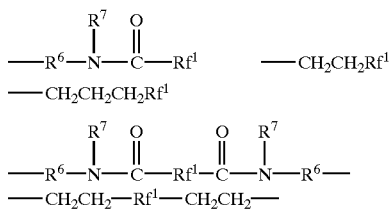

In the above formulae, R⁶ stands for divalent hydrocarbon radicals of 1 to 10 carbon atoms, and especially 2 to 6 carbon atoms, for example, alkylene radicals such as methylene, ethylene, propylene, methylethylene, tetramethylene and hexamethylene, and arylene radicals such as phenylene. R⁷ stands for hydrogen or monovalent hydrocarbon radicals of 1 to 8 carbon atoms, and especially 1 to 6 carbon atoms as described for R². Rf¹ stands for monovalent perfluoroalkyl, monovalent perfluorooxyalkyl, divalent perfluorooxyalkylene or divalent perfluoroalkylene radicals as described above.

In addition to the monovalent organic radical containing a mono or di-valent fluorinated substituent, i.e., a perfluoroalkyl, perfluorooxyalkyl, perfluorooxyalkylene or perfluoroalkylene radical, the fluorinated organohydrogensiloxane (B) has a monovalent substituent attached to a silicon atom, which is typically selected from aliphatic unsaturation-free monovalent hydrocarbon radicals of 1 to 10 carbon atoms, and especially 1 to 8 carbon atoms, as described for R².

In the fluorinated organohydrogensiloxane, the number of silicon atoms in a molecule is usually about 2 to 60, preferably about 4 to 30 though not limited thereto.

Examples of the fluorinated organohydrogensiloxane are given below. They may be used alone or in admixture of two or more. Note that Me is methyl and Ph is phenyl.

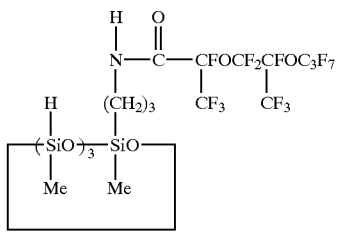
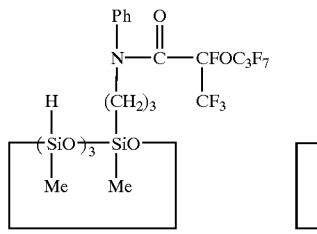
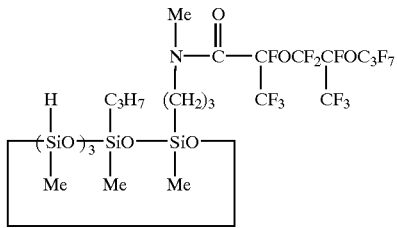
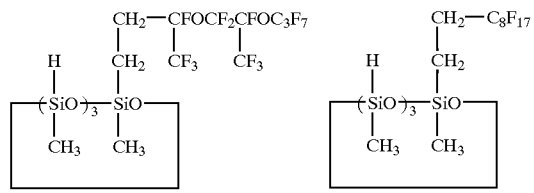
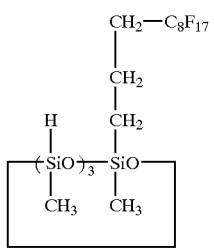
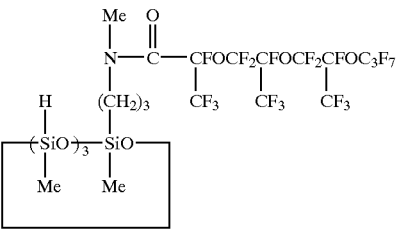
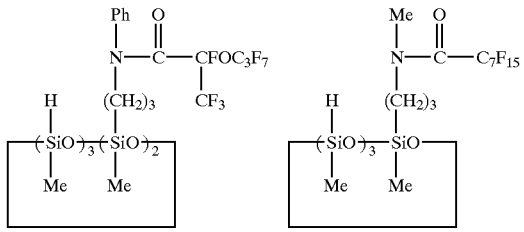
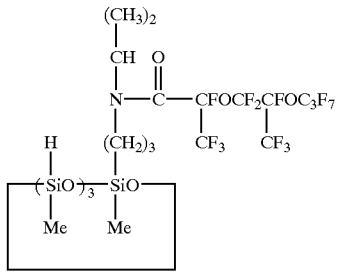
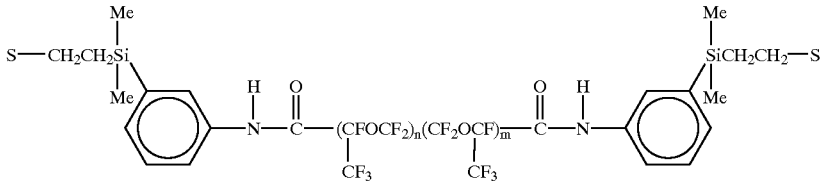
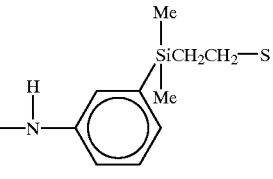
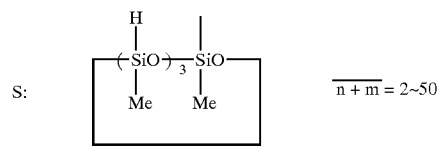
$\overline{n + m} = 2 \sim 50$

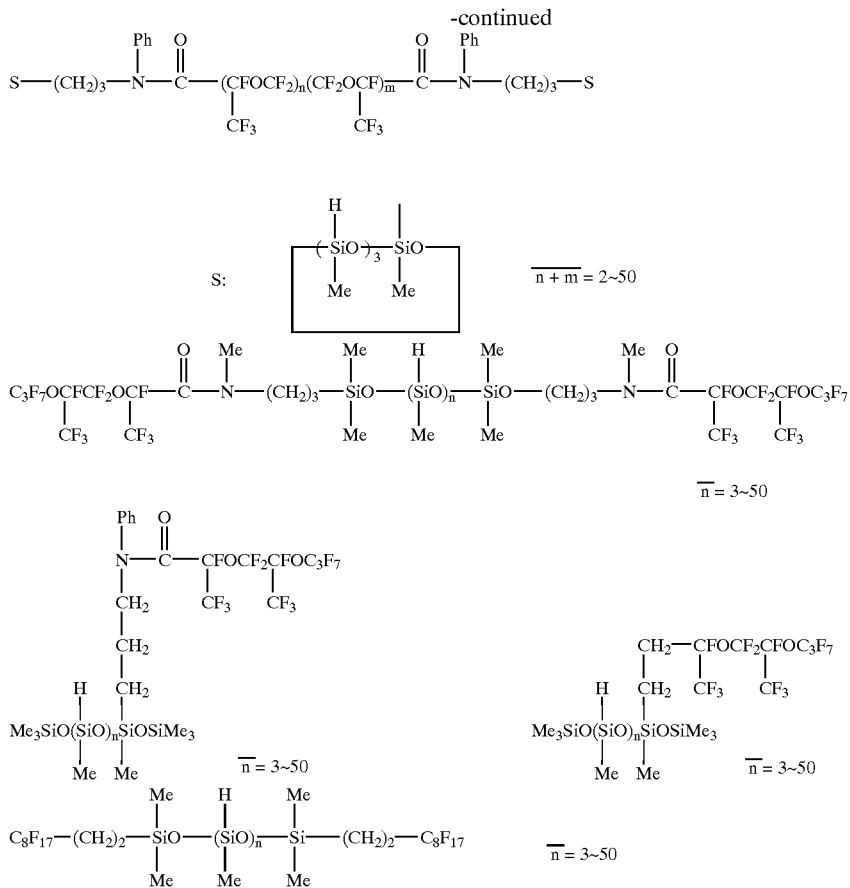

If the fluorinated organohydrogensiloxane (B) used is compatible with the fluorinated amide compound (A), then the curable composition will cure into a uniform product.

Component (B) is preferably used in such amounts that 0.5 to 5 mol, more preferably 1 to 2 mol of hydrosilyl radicals (i.e., SiH radicals) are available per mol of aliphatic unsaturated radicals such as alkenyl (e.g., vinyl and allyl) and cycloalkenyl radicals in the entire composition. Amounts of component (B) giving less than 0.5 mol of SiH radicals may achieve an insufficient degree of crosslinking. With excessive amounts of component (B) giving more than 5 mol of SiH radicals, chain extension may become preferential, resulting in undercure, foaming, heat resistance decline and/or compression set decline. More illustratively, about 0.1 to 50 parts by weight of component (B) is preferably blended with 100 parts by weight of component (A).

Component (C) of the inventive composition is a platinum group compound for promoting addition reaction or hydrosilylation between the fluorinated amide compound (A) and the fluorinated organohydrogensiloxane (B), that is, a curing promoter. These compounds are generally noble metal compounds which are expensive, and therefore, platinum compounds which are relatively easily available are often employed.

The platinum compounds include, for example, chloroplatinic acid, complexes of chloroplatinic acid with olefins such as ethylene, complexes of chloroplatinic acid with alcohols and vinylsiloxanes, and platinum on silica, alumina or carbon, though not limited thereto. Known examples of the platinum group compounds other than the platinum compound are rhodium, ruthenium, iridium and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$.

The catalyst may be used as such if it is a solid catalyst. However, to obtain a more uniform cured product, it is recommended that a solution of chloroplatinic acid or a complex thereof in a suitable solvent be admixed with the fluorinated amide compound (A) in a miscible manner.

The amount of the catalyst used is not critical and a catalytic amount may provide a desired cure rate. From the economical standpoint and to obtain a satisfactory cured product, the preferred amount of the catalyst is about 1 to 1,000 parts by weight, more preferably about 5 to 500 parts by weight of platinum group metal per million parts by weight of the entire composition.

Component (D) is a first organosiloxane which renders the composition self-adhesive when blended therein. The first organosiloxane should have in a molecule at least one hydrogen atom directly attached to a silicon atom (that is, at least one SiH radical), and at least one of epoxy radicals and trialkoxysilyl radicals each attached to a silicon atom through a carbon atom (attached directly to that silicon atom) or a carbon atom and an oxygen atom, and preferably further have at least one perfluoroalkyl or perfluorooxyalkyl radical attached to a silicon atom through a carbon atom (attached directly to that silicon atom).

The siloxane skeleton of the organosiloxane may be cyclic, chain-like or branched or a mixture thereof. These organosiloxanes are represented by the following average compositional formulae.

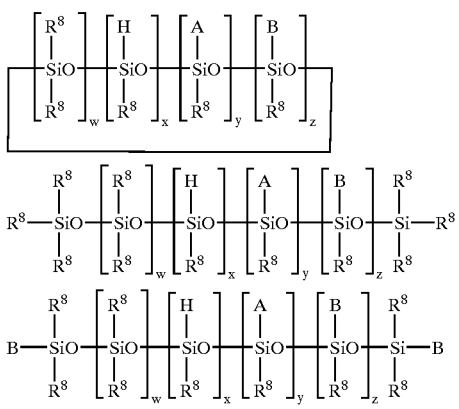

Herein $R^8$ is a substituted or unsubstituted monovalent hydrocarbon radical, as defined above for $R^1$. "A" is an epoxy and/or trialkoxysilyl radical attached to a silicon atom through a carbon atom or a carbon atom and an oxygen atom. "B" is a perfluorooxyalkyl or perfluoroalkyl radical attached to a silicon atom through a carbon atom.

Illustrative examples of A are radicals of the following formula:

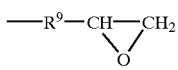

wherein $R^9$ is a divalent hydrocarbon radical of 1 to 10 carbon atoms, especially 1 to 5 carbon atoms, which may be separated by an oxygen atom, typically alkylene or cycloalkylene; and radicals of the following formula:

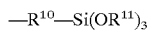

wherein $R^{10}$ is a divalent hydrocarbon radical of 1 to 10 carbon atoms, especially 1 to 4 carbon atoms, typically alkylene, and $R^{11}$ is a monovalent hydrocarbon radical of 1 to 8 carbon atoms, especially 1 to 4 carbon atoms, typically alkyl.

Illustrative examples of B are radicals of the following formulae:

wherein $R^{12}$ is a radical as defined for $R^{10}$ or a radical as represented by

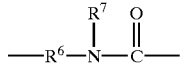

wherein $R^6$ and $R^7$ are as defined above, m is an integer of 1 to 20, preferably 2 to 10 and n is an integer of 1 to 5.

The letters w, x and z each are an integer inclusive of 0, y is an integer of at least 1, and w+x+y+z is usually from about 2 to 60, and preferably about 4 to 30. In the case of a cyclic siloxane structure, the number of silicon atoms forming a siloxane ring is desirably from 3 to about 50 from the standpoint of ease of synthesis.

The first organosiloxane can be synthesized by effecting partial addition reaction of a compound having an aliphatic unsaturated radical (e.g., vinyl or allyl) and an epoxy and/or trialkoxysilyl radical and optionally, a compound having an aliphatic unsaturated radical and a perfluoroalkyl or perfluorooxyalkyl radical to an organohydrogenpolysiloxane having at least three hydrogen atoms each attached to a silicon atom (SiH radicals) in a molecule in a conventional manner. It is understood that the number of aliphatic unsaturated radicals should be smaller than the number of SiH radicals.

After the completion of reaction, the end compound may be isolated although the reaction product from which only the unreacted reactants and the addition reaction catalyst have been removed may be used as well.

Illustrative examples of the first organosiloxane (D) are shown below by structural formulae. These compounds may be used alone or in admixture of two or more.

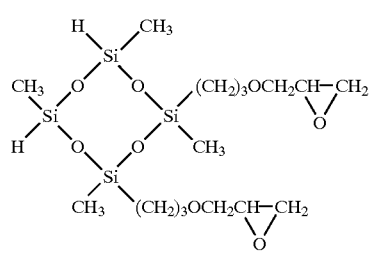

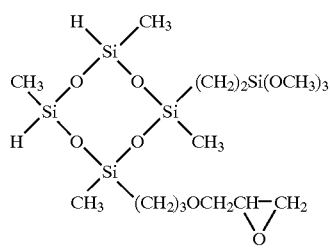

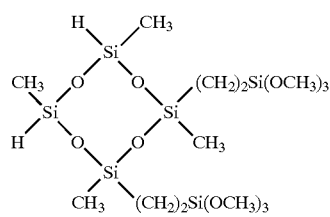

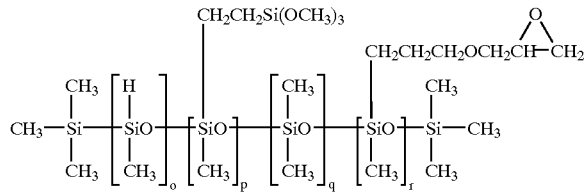

(o, q and r are positive integers and p is an integer inclusive of 0.)

-continued
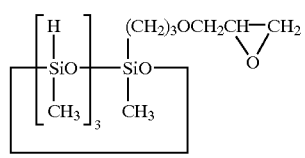 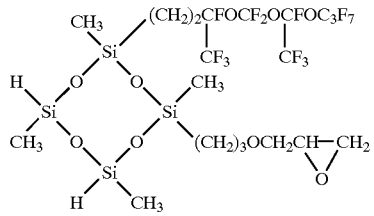
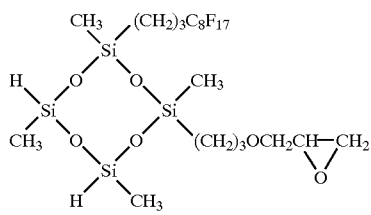
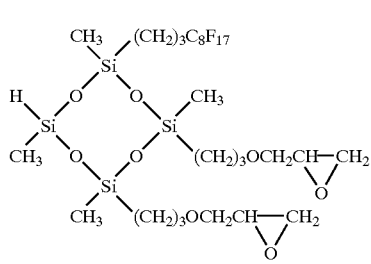 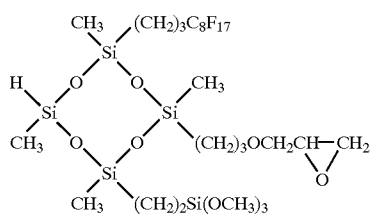
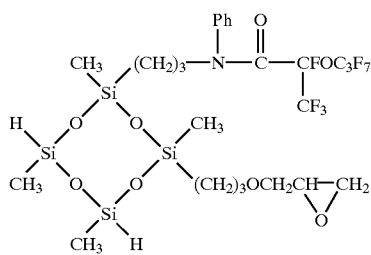 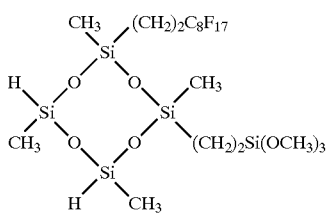
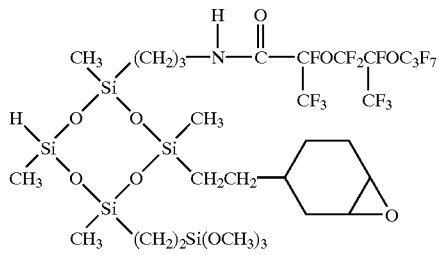
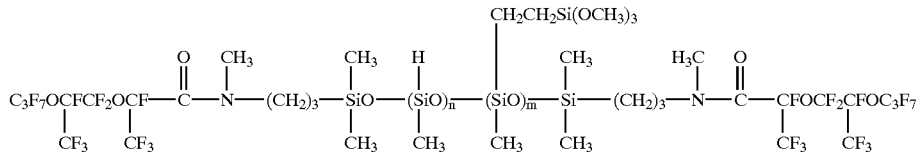
$\overline{n+m} = 3\sim50$ -continued

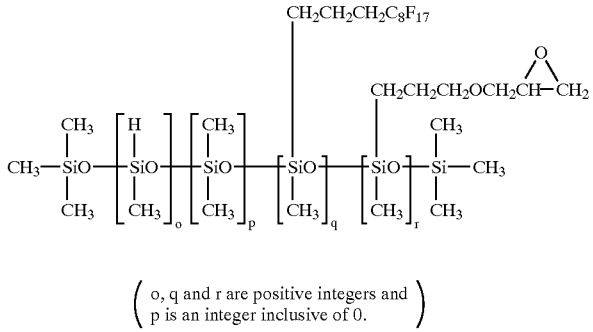

(o, q and r are positive integers and p is an integer inclusive of 0.)

An appropriate amount of the first organosiloxane (D) used is about 0.1 to 20 parts, more preferably about 0.3 to 10 parts by weight per 100 parts by weight of component (A). Less than 0.1 part of organosiloxane (D) may be insufficient to provide a satisfactory bonding force. More than 20 parts of organosiloxane (D) often inhibits cure and may adversely affect the physical properties of the cured product.

It is noted that the amount of component (B) blended is determined by taking into account the amount of component (D) blended as well as the amount of component (A). As previously described, component (B) is preferably used in such amounts that 0.5 to 5 mol of SiH radicals are available per mol of aliphatic unsaturated radicals such as vinyl, allyl and cycloalkenyl radicals in the entire composition.

Component (E) is a second organosiloxane which is effective for enhancing the tackifying capability of component (D) for helping the inventive composition to develop bonding nature. The second organosiloxane should have in a molecule at least one hydrogen atom directly attached to a silicon atom, at least one cyclic carboxylic anhydride residue attached to a silicon atom through a carbon atom, and at least one monovalent perfluorooxyalkyl or perfluoroalkyl radical attached to a silicon atom through a carbon atom. Its siloxane skeleton is preferably cyclic or chain-like. The second organosiloxanes include those of the following average compositional formulae.

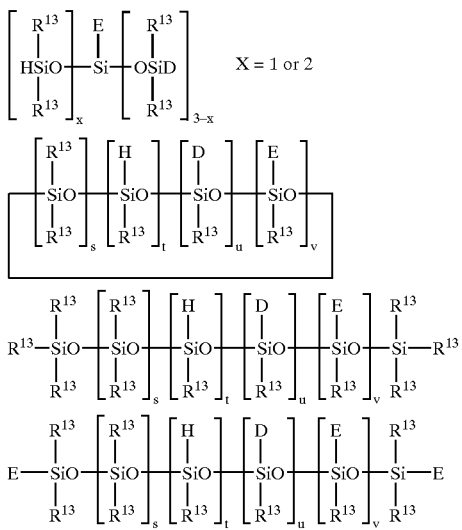

Herein $R^{13}$ is a substituted or unsubstituted monovalent hydrocarbon radical, as exemplified above for $R^1$. "D" is a cyclic carboxylic anhydride residue attached to a silicon atom through a carbon atom. "E" is a perfluorooxyalkyl or perfluoroalkyl radical attached to a silicon atom through a carbon atom.

Illustrative examples of D are radicals of the following formula:

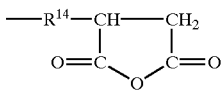

wherein $R^{14}$ is a divalent hydrocarbon radical of 1 to 15 carbon atoms, especially 2 to 10 carbon atoms, such as alkylene or alkenylene, as exemplified above for $R^3$.

Illustrative examples of E are radicals of the following formulae:

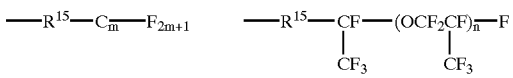

wherein $R^{15}$ is a radical as defined for $R^{10}$ or a radical as represented by

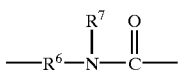

wherein $R^6$ and $R^7$ are as defined above, m is an integer of 1 to 20, preferably 2 to 10, and n is an integer of 1 to 5.

The letter s is an integer inclusive of 0, and t, u and v are integers of at least 1, and s+t+u+v is usually about 3 to 50, and preferably about 4 to 30.

The second organosiloxane (E) can be synthesized by effecting partial addition reaction of a compound having an aliphatic unsaturated radical (e.g., vinyl or allyl) and a cyclic carboxylic anhydride residue and a compound having an aliphatic unsaturated radical (e.g., vinyl or allyl) and a perfluorooxyalkyl or perfluoroalkyl radical to an organohydrogenpolysiloxane having at least three hydrogen atoms each attached to a silicon atom (SiH radicals) in a molecule while applying the hydrosilylation reaction well known in the silicone art. It is understood that the number of aliphatic unsaturated radicals should be smaller than the number of SiH radicals.

After the completion of reaction, the end compound may be isolated although the reaction product from which only the unreacted reactants and the addition reaction catalyst have been removed may be used as well.

Illustrative, non-limiting examples of the second organosiloxane (E) are shown below by structural formulae. These compounds may be used alone or in admixture of two or more.

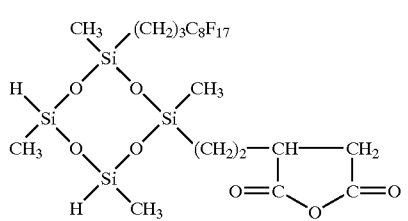
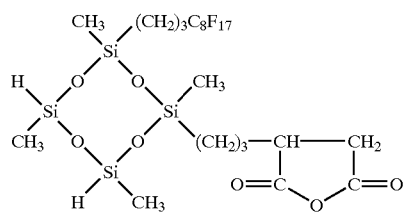
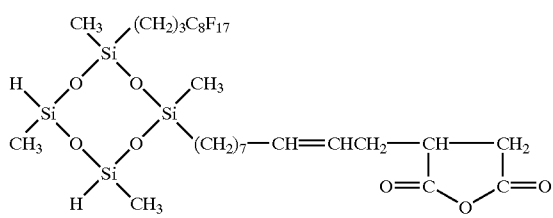
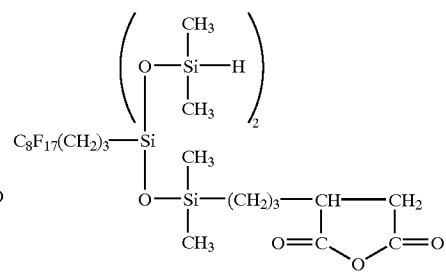
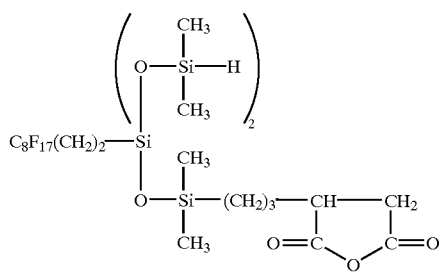
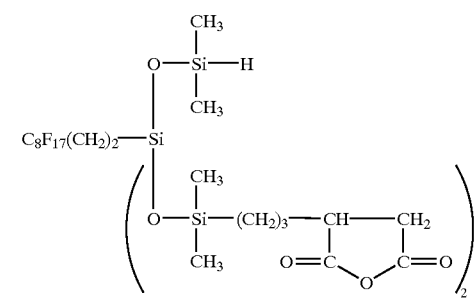
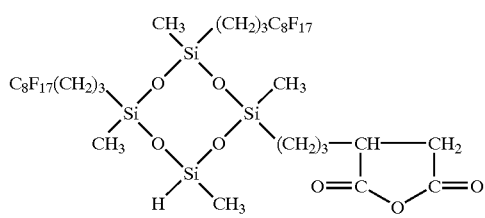
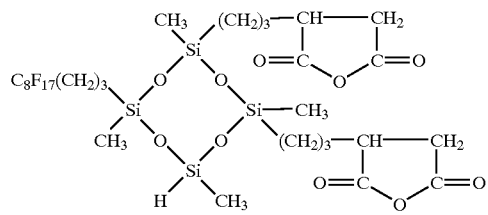
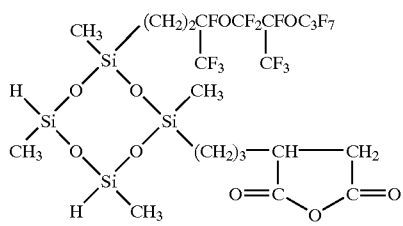
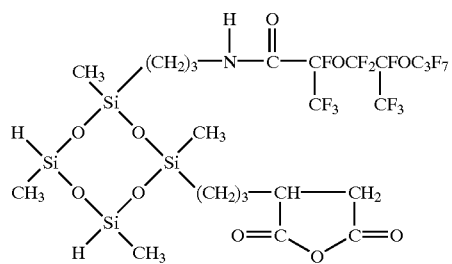
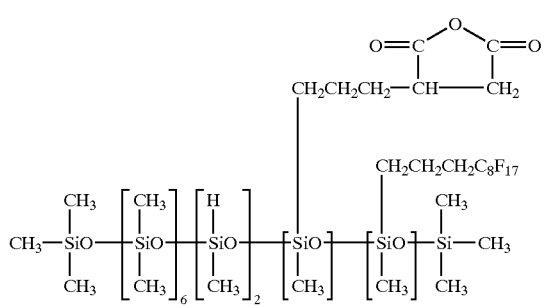
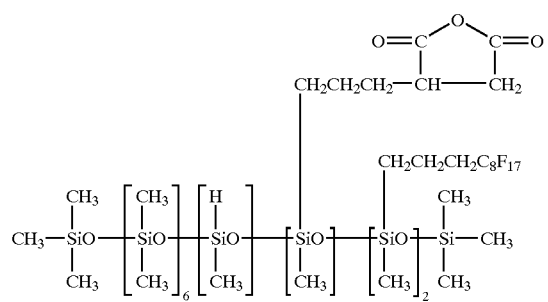

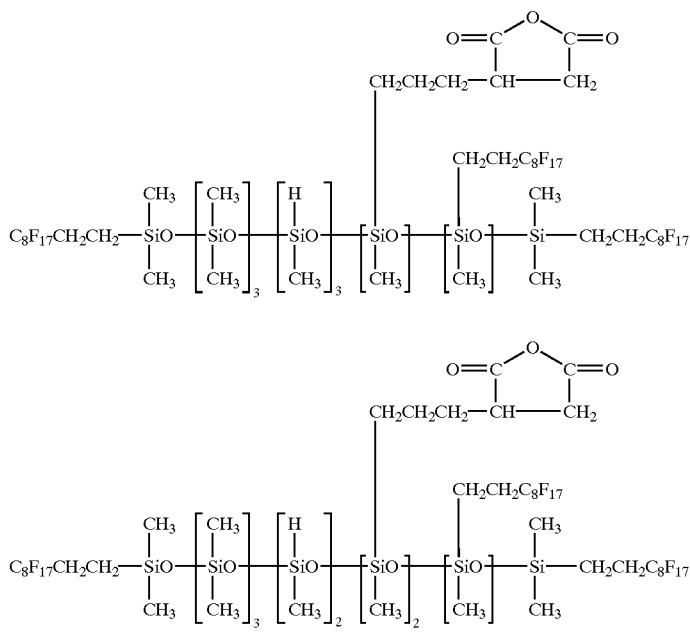

An appropriate amount of the second organosiloxane (E) used is about 0.1 to 20 parts, more preferably about 0.3 to 10 parts by weight per 100 parts by weight of component (A). Less than 0.1 part of organosiloxane (E) may be insufficient to provide satisfactory adhesion acceleration. More than 20 parts of organosiloxane (E) may detract from the storage stability of the composition and adversely affect the physical properties of the cured product.

It is noted that the amount of component (B) blended is determined by taking into account the amount of component (E) blended as well as the amount of component (A). As previously described, component (B) is preferably used in such amounts that 0.5 to 5 mol of SiH radicals are available per mol of aliphatic unsaturated radicals such as vinyl, allyl and cycloalkenyl radicals in the entire composition.

In addition to the above-mentioned essential components, other optional components may be added to the inventive composition. Typical additives include reaction controlling agents, for example, acetylene compounds (e.g., acetylenic alcohols and silylated acetylenic alcohols), olefinic siloxanes and ethylenically unsaturated isocyanurates, preferably having in a molecule monovalent fluorinated substituent groups as described above; reinforcing silica fillers such as fumed silica, precipitated silica, and silica aerogel, the foregoing silica powders which are surface treated with organochlorosilanes, organodisilazanes, and cyclic organopolysilazanes, and the surface treated silica powders which are further treated with organosilanes or organosiloxanes having monovalent fluorinated substituent groups as described above; reinforcing or semi-reinforcing fillers such as quartz flour, fused quartz powder, diatomaceous earth, and calcium carbonate; inorganic pigments such as titanium oxide, iron oxide, carbon black, and cobalt aluminate; heat resistance modifiers such as titanium oxide, iron oxide, carbon black, cerium oxide, cerium hydroxide, zinc carbonate, magnesium carbonate, and manganese carbonate; heat conductive agents such as alumina, boron nitride, silicon carbide and powdered metals; and electroconductive agents such as carbon black, powdered silver and conductive zinc white. In addition, non-functional perfluoropolyethers and/or fluorinated amide compounds of general formula (9) below may be added as plasticizers, viscosity modifiers and flexibility-imparting agents.

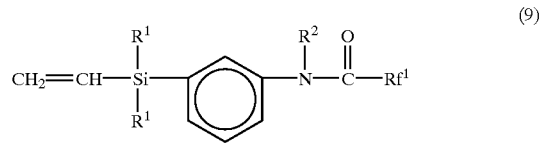

(9)

In formula (9), $R^1$, $R^2$ and $Rf^1$ are as defined above.

Other additives that may be included are adhesion promoters such as titanic acid esters, adhesion aids other than component (D), and silane coupling agents. The above additives may be added in any suitable amount, insofar as the objects of the invention are attainable.

Any desired method may be used in preparing the composition of the invention. For example, components (A) to (E) and optional components are uniformly mixed by a suitable mixer such as a planetary mixer, Ross mixer, or Hobert mixer or a suitable milling machine such as a three-roll mill or kneader. The inventive composition is curable at room temperature depending on the functional radical in the fluorinated amide compound (A) and the catalyst (C) used. However, it is recommended to heat the composition in order to promote cure. In order that the composition firmly bond to a variety of substrates, the composition is preferably cured by heating at a temperature of 60° C. or higher, especially 100 to 200° C. for several minutes to several hours.

On use of the curable composition of the invention, it may be dissolved in a suitable fluorochemical solvent such as m-xylene hexafluoride or fluorinate to an appropriate concentration depending on a particular application and purpose.

The curable compositions of the invention cure into products or fluorinated elastomers which have good solvent resistance, chemical resistance, heat resistance, low-temperature properties, low moisture permeability, and good electrical properties and form a firm bond to metal and plastic substrates by heating at a relatively low temperature for a brief time. Since the fluorinated elastomers as cured are adherent to PPS, polyamide and polyimide resins, the compositions are useful in the bonding of automotive parts and electrical and electronic parts using such plastics as the base.

EXAMPLE

Examples of the invention are given below by way of illustration and not by way of limitation. All parts are by weight. Properties such as viscosity (centistokes) and bond strength were measured at 25° C. Me is methyl.

Example 1

A planetary mixer was charged with 100 parts of a polymer of formula (10) below (viscosity 5,500 cs, average molecular weight 17,000, vinyl content 0.012 mol/100 g), to which 100 parts of fumed silica (BET specific surface area 110 m$^2$/g) surface treated with dimethyldichlorosilane was added. The contents were raised to a temperature of 170° C. and heat-treated for 2 hours in vacuum (60 Torr) while being kneaded. The contents were cooled below 40° C. and passed two times through a three-roll mill, obtaining a base compound.

To 44 parts of the base compound was added 60 parts of a polymer of formula (10) below. They were mixed until uniform. There were successively added 0.20 part of a toluene solution of platinum-divinyltetramethyldisiloxane complex (platinum concentration 1.0 wt %), 0.3 part of a 50% toluene solution of ethynylcyclohexanol, 1.6 parts of fluorinated organohydrogensiloxane of formula (11) below, 1.1 parts of fluorinated organohydrogensiloxane of formula (12) below, 2.0 parts of a tackifier of formula (13) below, and 1.5 parts of a cyclic carboxylic anhydride residue-containing siloxane of formula (14) below. The ingredients were mixed until uniform and thereafter, degassed, yielding the final composition.

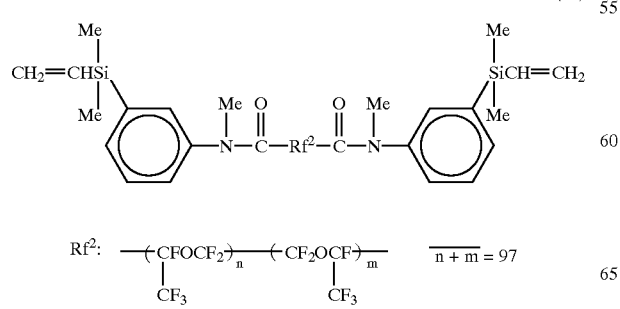

(10)

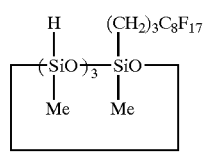

(11)

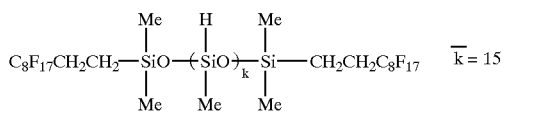

(12)

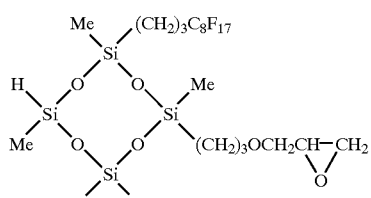

(13)

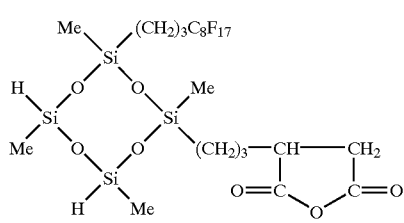

(14)

A 1 mm thick layer of the composition was sandwiched between two 100×25 mm test panels of a plastic material (PPS, nylon 66, polyimide, PBT, epoxy or phenolic resin), the panels being arranged so as to mutually overlap by 10 mm at the ends. The composition was then cured by heating at 150° C. for 1 hour, thereby giving an adhesion test specimen. Each of the resulting specimens was subjected to a tensile shear bond test (pulling speed 50 mm/min), and the shear bond strength (kgf/cm$^2$) and cohesive failure (area %) were determined. The results are shown in Table 1.

Example 2

A composition was prepared as in Example 1 except that 2.0 parts of a cyclic carboxylic anhydride residue-containing siloxane of formula (15) below was used instead of 1.5 parts of the siloxane of formula (14). A tensile bond test was similarly carried out, with the results being shown in Table 1.

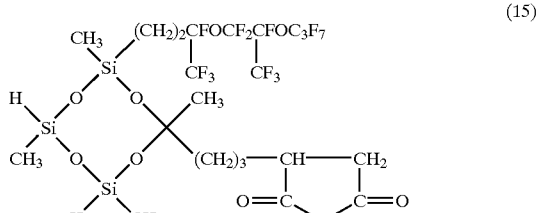

(15)

Example 3

A composition was prepared as in Example 1 except that 2.0 parts of a cyclic carboxylic anhydride residue-containing siloxane of formula (16) below was used instead of 1.5 parts of the siloxane of formula (14). A tensile bond test was similarly carried out, with the results being shown in Table 1.

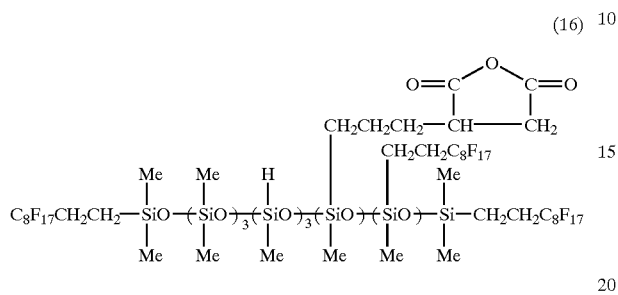

(16)

Comparative Example

A composition was prepared as in Example 1 except that the cyclic carboxylic anhydride residue-containing siloxane of formula (14) was omitted. A tensile bond test was similarly carried out, with the results being shown in Table 1.

Example 4

A composition was prepared as in Example 1 except that 1.5 parts of a cyclic carboxylic anhydride residue-containing siloxane of formula (17) below was used instead of 1.5 parts of the siloxane of formula (14). A tensile bond test was similarly carried out, with the results being shown in Table 1.

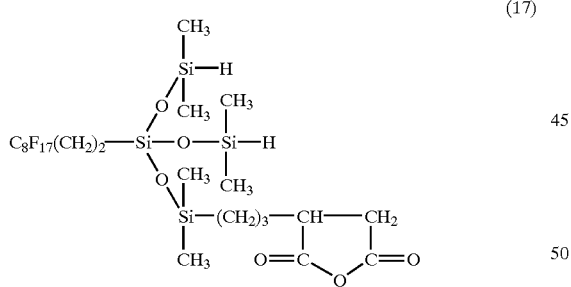

(17)

Japanese Patent Application No. 2000-304514 is incorporated herein by reference.

Reasonable modifications and variations are possible from the foregoing disclosure without departing from either the spirit or scope of the present invention as defined by the claims.

What is claimed is:

1. A curable composition comprising as essential components, (A) a fluorinated amide compound having at least one alkenyl radical in a molecule, (B) a fluorinated organohydrogensiloxane, (C) a platinum group compound, (D) a first organosiloxane having in a molecule at least one hydrogen atom directly attached to a silicon atom, and at least one of epoxy radicals and trialkoxysilyl radicals each attached to a silicon atom through a carbon atom or a carbon atom and an oxygen atom, and (E) a second organosiloxane having in a molecule at least one hydrogen atom directly attached to a silicon atom, at least one cyclic carboxylic anhydride residue attached to a silicon atom through a carbon atom, and at least one monovalent perfluorooxyalkyl or perfluoroalkyl radical attached to a silicon atom through a carbon atom.

2. The curable composition of claim 1 wherein the first organosiloxane (D) further has in a molecule at least one monovalent perfluorooxyalkyl or perfluoroalkyl radical attached to a silicon atom through a carbon atom.

3. The curable composition of claim 1 wherein the fluorinated amide compound (A) is of the following general formula (1):

TABLE 1

| | Bond strength, kgf/cm$^2$ (cohesive failure, area %) | | | | |
|---|---|---|---|---|---|
| | Example 1 | Example 2 | Example 3 | Example 4 | Comparison |
| PPS resin | 14 (100) | 13 (100) | 14 (100) | 13 (100) | 4 (0) |
| Nylon 66 resin | 12 (100) | 11 (100) | 12 (100) | 12 (100) | 3 (0) |
| Polyimide resin | 15 (100) | 14 (100) | 15 (100) | 14 (100) | 6 (20) |
| PBT resin | 13 (100) | 12 (100) | 14 (100) | 13 (100) | 11 (100) |
| Epoxy resin | 16 (100) | 15 (100) | 17 (100) | 15 (100) | 14 (100) |
| Phenolic resin | 14 (100) | 13 (100) | 13 (100) | 13 (100) | 12 (100) |

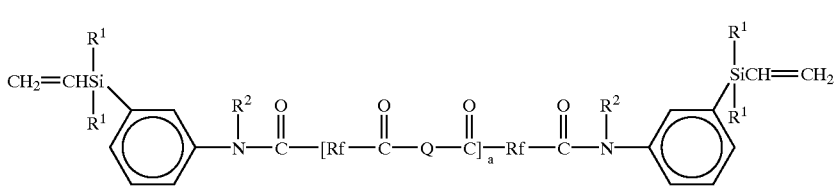 (1)

wherein $R^1$ is a substituted or unsubstituted monovalent hydrocarbon radical, $R^2$ is hydrogen or a substituted or unsubstituted monovalent hydrocarbon radical, Q is a radical of the following general formula (2) or (3):

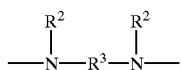 (2)

wherein $R^3$ is a substituted or unsubstituted divalent hydrocarbon radical which may be separated by at least one atom of oxygen, nitrogen and silicon atoms, and $R^2$ is as defined above,

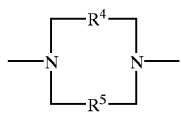 (3)

wherein $R^4$ and $R^5$ each are a substituted or unsubstituted divalent hydrocarbon radical, Rf is a divalent perfluoroalkylene or perfluoropolyether radical, and "a" is an integer of at least 0.

4. The curable composition of claim 1 wherein the fluorinated organohydrogensiloxane (B) has at least one of monovalent perfluorooxyalkyl, monovalent perfluoroalkyl, divalent perfluorooxyalkylene and divalent perfluoroalkylene radicals and at least two hydrosilyl radicals in a molecule.

5. The curable composition of claim 1 wherein the fluorinated amide compound (A) has two alkenyl radicals, one at each end of the compound.

6. The curable composition of claim 1 wherein the fluorinated organohydrogensiloxane (B) serves as a cross linker and chain extender for the fluorinated amide compound (A).

7. The curable composition of claim 1 wherein the fluorinated organohydrogensiloxane (B) has at least one radical selected from the group consisting of: perfluorooxyalkyl, perfluoroalkyl, perfluorooxalkylene, and perfluoroalkylene.

8. The curable composition of claim 1 wherein the platinum group compound is carried by a support selected from the group consisting of those of silica, alumina, and carbon.

9. The curable composition of claim 1 wherein the platinum group compound comprises a metal selected from the group consisting of platinum, rhodium, ruthenium, iridium, and palladium.

10. The curable composition of claim 1 wherein the first organosiloxane (D) renders the curable composition self-adhesive.

11. The curable composition of claim 1 wherein the second organosiloxane (E) enhances the tackifying capability of the first organosiloxane (D).

* * * * *